Patented Apr. 3, 1951

2,547,036

UNITED STATES PATENT OFFICE 2,547,036

HYDROCARBON CONVERSION PROCESSES WITH ACID-TREATED CLAY CATALYSTS

George Alexander Mills, Swarthmore, Pa., assignor to Houdry Process Corporation, Philadelphia, Pa., a corporation of Delaware No Drawing. Application October 13, 1948, Serial No. 54,362

8 Claims. (Cl. 196—52)

The present invention relates to clay catalysts and is particularly directed to the preparation from clays of catalysts having modified properties for cracking of hydrocarbons and their use in such processes.

In prior copending applications (among which are applications Serial Nos. 644,423 and 681,426, now issued as U. S. Patents, Nos. 2,466,048 and 2,466,050, respectively, in which I am a joint inventor) certain methods are described for the preparation of modified clay catalysts of improved properties. The methods disclosed in said applications include sulfidation of the clay at elevated temperature which results in freeing of tenaciously bound iron from the clay structure, followed by removal of the iron thus freed, for instance by acid leaching. The products thus obtained, in addition to certain desirable changes in physical properties and enhanced stability are disclosed as having improved catalytic properties not only for cracking of corrosive stocks but also in cracking of "sweet" stocks.

The catalytic products obtained by the treatment described in said copending applications, when starting from magnesia-containing clays, are composed substantially of complex combinations of silica and alumina with minor portions of magnesia and are substantially free of iron and other fluxing impurities. These catalysts not only are superior to known commercial clay catalysts but compare favorable with usual silica-alumina synthetic gel cracking catalysts, from the standpoint of increased gasoline yields obtained in cracking of typical petroleum charge stocks with the production of reduced quantities of gaseous products. The anti-knock qualities of the catalytically cracked gasoline obtained when employing the described modified clay catalysts, however, particularly as determined by "Research" methods, are somewhat below that of the gasoline obtained from cracking in the presence of the synthetic silica-alumina gel catalysts at the same cracking temperatures. Accordingly it appears that these modified clay catalysts exhibit catalytic properties which seem to be characteristic of both silica-alumina and silica-magnesia synthetic gel catalysts, the lower octane rating of the catalytically cracked gasoline obtained therewith being generally associated with silica-magnesia catalysts.

I have found that the catalytic properties of active clay cracking catalysts comprising silica, alumina and magnesia which are comparatively free of fluxing impurities and have less than 0.4% $Fe_2O_3$, and particularly such active clay catalysts as are obtained by leaching the clays after sulfidation at elevated temperature, can be further adjusted by a special treatment to obtain catalysts producing higher octane gasoline. This adjustment is brought about in accordance with the present invention by selectively deactivating the magnesia in the clay by thermal treatment at certain high temperatures without corresponding deactivation of the silica-alumina. Thus, by heating a clay catalyst containing silica, alumina and magnesia, and which is substantially free of fluxing impurities, for a sufficient period at above about 1425° F. there is obtained a catalyst producing in cracking of liquid hydrocarbons, gasoline of enhanced octane rating, approaching or equalling the anti-knock qualities of gasoline obtained from cracking with synthetic silica-alumina gels.

In carrying out the heat-treating step above described, temperatures at which substantial surface fusion of the clay occurs with material loss of porosity should be avoided. As is the case with the iron-free modified clay catalysts hereinbefore described, when the clay subjected to such heat treatment does not contain a disproportionately high proportion of alkali metal or other fluxing impurities including iron and calcium, temperatures up to about 1600° F. or somewhat above may be safely employed in flowing air or other inert gas and in the absence of water vapor in excess of about 0.3 volume percent in the gaseous atmosphere surrounding the clay. With a larger content of fluxing impurities, particularly alkali metal, lower treating temperatures within the indicated range are advised. At about 1425° F. the treatment should be conducted for at least about 1 hour and preferably for about 2 to 5 hours. At higher temperatures less time may be required to obtain the same effect. No advantage is seen for prolonging the treatment beyond the time indicated, although no adverse effects due thereto have been found.

The presence of water vapor during heating of the clay is believed to have at most only a minor effect on the associated magnesia as such; however the known effects of steam on silica-alumina (in clay or synthetic catalysts) must be taken into consideration. These effects are described in U. S. Patent No. 2,375,757, issued May 15, 1945, to John R. Bates. Accordingly, the presence of steam as up to about 30% by volume of the gaseous atmosphere surrounding the clay can be safely employed at temperatures below about 1500° F., and offer certain advantages from the standpoint of further reducing the coking characteristics of the catalyst. At higher temperatures the presence of steam in excess of the stated 0.3 volume percent is not advised because of difficulties of accurately controlling the short treating time that the clay may withstand without suffering excessive loss in catalytic activity.

Although certain other clays such as those of the kaolin type may at times contain magnesium, and these accordingly come within the scope of the present invention, the more typical magnesium-containing clays are those of the montmorillonite type comprising chiefly the acid-activable sub-bentonites.

These acid activable sub-bentonite clays, although there may be individual differences in composition, for the most part conform substantially to the theoretical formula $Al_2O_3.4SiO_2.H_2O$ and typically show on analysis in mined state (previous to acid activation treatment) a content (on a volatile free basis) of about 6% MgO and approximately 2 or 3% $Fe_2O_3$ or above. By the usual acid activation of such clays (such as is commercially employed) with aqueous sulfuric acid at elevated temperature, a portion of the aluminum content is removed from the clay together with part of the magnesium and some iron. The acid-activated clays thus obtained still contain typically over 1.5% $Fe_2O_3$ and over 4% magnesia. By subjecting sub-bentonite clays of this type to sulfidation at selected elevated temperatures and then leaching the sulfided clay with acid (as described for instance in the co-pending applications hereinbefore referred to) almost complete removal of iron is brought about and the major part of the remaining calcium is also removed, while the magnesia and alumina content is only slightly reduced. A typical analysis of the modified clay thus obtained is shown below (calculated on a volatile free basis):

| | |
|---|---|
| Si as $SiO_2$ | 76.7 |
| Al as $Al_2O_3$ | 18.2 |
| Fe as $Fe_2O_3$ | 0.1 |
| Ca as CaO | 0.97 |
| Mg as MgO | 4.4 |

As indicated above the modified clay catalysts prepared by subjecting a magnesia-containing clay, particularly an acid-treated montmorillonite clay, to sulfidation at temperatures above about 1200° F. and acid leaching, characteristically give higher gasoline yields in cracking of typical charge stocks than either synthetic silica-alumina catalysts or commercial acid-activated clay catalysts, whether compared at the same operating conditions or at selected operating conditions respectively adjusted to produce the same quantity of coke.

For catalytic cracking operations wherein highest octane gasoline is desired even at the sacrifice of gasoline yields, catalysts having the characteristics of synthetic silica alumina gel catalysts are preferred despite their considerably higher cost. In accordance with the present invention, however, catalysts producing cracked gasoline of the higher octane ratings characteristic of that produced with synthetic silica-alumina catalysts, can be obtained directly from clay by a simple and inexpensive procedure. Moreover, the operation in thus altering the clay is quite flexible, so that catalysts can be prepared from the same source clay and by simple control of conditions and adjustment of the treatment, catalysts of different properties obtained to satisfy the needs of particular refinery operations as higher octanes or higher gasoline yields are called for.

The preparation of a modified clay catalyst in which the magnesia has been deactivated to confer higher octane producing properties is illustrated by the following example:

EXAMPLE I (a) A commercial acid-activated sub-bentonite montmorillonite clay (Filtrol), giving on analysis (105° C. dry weight basis) about 1.8% $Fe_2O_3$ and about 4.3% MgO, after adjustment of its water content to extrudable consistency, was extruded to form cylindrical pellets, which were dried. These pellets were then sulfided for one hour at 1400° F. in a gaseous atmosphere containing 75% nitrogen, 25% $H_2S$ (by vol.), and the sulfided pellets, after cooling to room temperature, were leached with aqueous hydrochloric acid of 10% HCl concentration for 4 hours, followed by two additional treatments with fresh acid of the same concentration of 10 hours each. The acid leached pellets were water washed until chloride freed and dried. These pellets now contained less than 0.1% $Fe_2O_3$ and about 4.5% MgO (calcined basis).

(b) The above pellets were heat treated in dried air (containing less than 0.1 mol % $H_2O$) for 2 hours at 1600° F. The activity of these heat treated pellets was then adjusted by treatment for 5 hours at 1400° F. in an atmosphere containing 6.5% by volume steam (to approximate the catalytic activity of the catalysts to be compared therewith), and the pellets employed in a cracking operation under conditions described in Table 1.

(c) For comparison with the above pellets, a cracking run was carried out under the same operating conditions employing a catalyst prepared similarly to (a) above, which was calcined at 1400° F. for 5 hours in 70% air-30% $H_2O$.

(d) Commercial synthetic silica-alumina pellets were steam treated to adjust activity and likewise employed in cracking under the same conditions.

Each of the catalysts under (b), (c), and (d) above after activity adjustment by steam treatment now had approximately the same activity index as determined by the CAT-A method; see J. Alexander and H. G. Shimp, page R-537, National Petroleum News, August 2, 1944. The activity index (A. I.) of the catalyst is expressed as the volume percent gasoline obtained in cracking a standard gas oil under conditions of the test.

The yields and octane values of the gasoline obtained with the several catalysts of the example are compared in the following table:

[Run conditions: Light East Texas Gas Oil; 875° F., 15 p. s. i. g., 0% steam, 10 minutes on-stream, 1.0 liquid space rate (vol. oil/vol. CAT./hr.).]

Table 1

| Catalyst | Synthetic silica-alumina, 32 A. I. (Example Id) | Modified clay, 31 A. I. (Example Ic) | Modified Clay calcined at 1600° F., 31 A. I. (Example Ib) |
|---|---|---|---|
| *Stabilized Material Balance* | | | |
| Conversion, Vol. per cent | 56.4 | 55.8 | 50.6 |
| Mtr. Gaso., 10# R. V. P., (365 @ 90%), Vol. per cent | 44.4 | 48.2 | 43.9 |
| Mtr. Gaso., $C_4$ free, Vol. per cent | 41.6 | 44.7 | 40.7 |
| Catalytic Cycle Stock, Vol. per cent | 43.6 | 44.2 | 49.4 |
| $C_4$ Cut, Vol. per cent | 14.3 | 10.7 | 10.3 |
| Dry Gas ($C_3$ and lighter) weight per cent | 5.6 | 5.0 | 4.6 |
| Carbon | 3.8 | 3.7 | 2.9 |
| Octanes: | | | |
| $F_2$ (mtr.), clear | 78.8 | 77.2 | 78.5 |
| +3 cc. TEL | 87.0 | 86.7 | 87.3 |
| $F_1$ (res.), clear | 88.0 | 85.1 | 88.0 |
| +3 cc. TEL | 96.3 | 95.2 | 96.9 |

EXAMPLE II (a) Another batch of sulfided and acid leached sub-bentonite clay dried pellets of substantially similar composition to that of Example Ia, was heat treated at an average temperature of about 1430° F. for 5 hours in an atmosphere of 8% flue gas-20% steam and then employed in a cracking operation under conditions described below.

(b) For comparison therewith, similar dried pellets were heat treated at 1400° F. for 5 hours in an atmosphere of 30% H2O-70% air.

The two catalysts described under (a) and (b) above showed approximately the same activity when tested by the CAT-A method.

Both catalysts were then employed in cracking a heavy East Texas gas oil fraction (29.0 A. P. I. gravity; 539 I. B. P., 95% @ 928° F. vacuum assay) at 900° F. under a pressure of 10 pounds per square inch gauge, 10% steam being added to the charge. The octane ratings of the obtained gasoline are shown in the table below:

*Table 2*

| Catalyst | Modified clay | Modified clay |
|---|---|---|
| Calcined at | 1400° F. | 1430° F. (avg.) |
| Octanes: | | |
| F2 (Motor) clear | 77.8 | 78.7 |
| + 3cc. TEL | 83.7 | 85.2 |
| F1 (Research) clear | 89.3 | 90.1 |
| + 3cc. TEL | 96.5 | 96.6 |

In the use of the catalysts according to the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

It will be seen, however, from the product distribution in Table 1 that the high temperature calcined clay catalyst of the invention under the same cracking conditions produced substantially less carbon than the synthetic silica alumina catalyst while producing only a slightly lower gasoline yield of about the same octanes. The production of valuable catalytic cycle stock obtained with the clay catalyst of the invention was considerably higher. If desired, in substituting the clay catalyst for synthetic in a hydrocarbon cracking operation the severity of the cracking conditions may be increased to approximate the percent conversion obtainable with synthetic or to approximate the coke make obtained with synthetic. This increase in severity may be had by raising the cracking temperature or by decreasing the space rate, or by both. By increasing the temperature of cracking the tendency will be to increase the octanes of the gasoline produced. On the other hand by maintaining the same temperature while modifying other conditions to increase the percent conversion, higher yields of gasoline can be obtained.

Obviously many modifications and variations of the invention as hereinbefore set forth may be made without departing from the spirit and scope thereof and therefore only such limitations should be imposed as are indicated in the appended claims.

The present application is a continuation-in-part of my joint applications, Serial No. 644,423 and 644,425, filed January 30, 1946, now issued as U. S. Patents, Nos. 2,466,048 and 2,466,050 respectively.

I claim as my invention:

1. The process of cracking normally liquid hydrocarbons which comprises contacting such hydrocarbons under catalytic cracking conditions with a modified acid-treated clay containing magnesia substantially free of alkali metal compounds and containing less than 0.4% of iron compounds calculated as $Fe_2O_3$, said catalyst having been heated to above 1425° F., and recovering from the cracked products a hydrocarbon fraction in the gasoline boiling range.

2. The process of claim 1 wherein said modified acid-treated clay is one prepared by sulfidation of an iron-containing clay at not less than 1200° F. followed by acid leaching of thus formed iron sulfides.

3. The process of claim 1 wherein said modified acid-treated clay is acid-treated montmorillonite clay which has been subjected to sulfidation at not less than 1200° F. followed by acid leaching.

4. The process of claim 1 wherein said catalyst is heated to below about 1500° F. in the presence of steam in an amount of up to about 30% by volume of the gaseous atmosphere surrounding the catalyst having such heating.

5. The process of cracking normally liquid hydrocarbons which comprises contacting such hydrocarbons under catalytic cracking conditions with a modified acid-treated clay containing magnesia substantially free of alkali metal compounds and containing less than 0.4% of iron compounds calculated as $Fe_2O_3$, said catalyst having been heated to about 1600° F. in a substantially dry atmosphere free from water vapor in excess of 0.3 volume percent.

6. The process of claim 5 wherein said modified acid-treated clay is acid-treated montmorillonite clay which has been subjected to sulfidation at not less than 1200° F. followed by acid leaching.

7. The process of claim 5 wherein said catalyst subjected to said heating operation contains not more than 0.1% of iron compounds calculated as $Fe_2O_3$.

8. In process of catalytically cracking hydrocarbons for the production of gasoline employing magnesia-containing active clay catalysts, the improvement which comprises calcining such active clay catalyst previous to use in cracking, by heating at a temperature in the range of 1425-1600° F. for a time sufficient to deactivate the magnesia content of said clay, whereby the gasoline obtained in said cracking is of improved antiknock qualities.

GEORGE ALEXANDER MILLS.

REFERENCES CITED

The following references are of record in the file of this patent:

UNITED STATES PATENTS

| Number | Name | Date |
|---|---|---|
| 2,431,206 | Spicer et al. | Nov. 18, 1947 |
| 2,432,746 | Garry et al. | Dec. 16, 1947 |
| 2,466,050 | Shabaker et al. | Apr. 5, 1949 |
| 2,466,051 | Shabaker et al. | Apr. 5, 1949 |